United States Patent
Oh et al.

(10) Patent No.: US 9,998,341 B2
(45) Date of Patent: Jun. 12, 2018

(54) METHOD OF CONSTRUCTING DATA COLLECTOR, SERVER PERFORMING THE SAME AND STORAGE MEDIUM FOR THE SAME

(71) Applicant: LG CNS CO., LTD., Seoul (KR)

(72) Inventors: Seokkeun Oh, Seoul (KR); Hyunsang Kang, Seoul (KR); Jongwon Park, Seoul (KR); Jooyoul Lee, Seoul (KR); Donjung Choi, Seoul (KR)

(73) Assignee: LG CNS CO., LTD., Seoul (KR)

( * ) Notice: Subject to any disclaimer, the term of this patent is extended or adjusted under 35 U.S.C. 154(b) by 283 days.

(21) Appl. No.: 14/593,875

(22) Filed: Jan. 9, 2015

(65) Prior Publication Data

US 2016/0204998 A1    Jul. 14, 2016

(51) Int. Cl.
  *G06F 15/173* (2006.01)
  *H04L 12/26* (2006.01)

(52) U.S. Cl.
  CPC .......... *H04L 43/045* (2013.01); *H04L 43/026* (2013.01)

(58) Field of Classification Search
  None
  See application file for complete search history.

(56) References Cited

U.S. PATENT DOCUMENTS

| | | | | |
|---|---|---|---|---|
| 2004/0078105 A1* | 4/2004 | Moon | ................... | G06Q 10/10 700/100 |
| 2007/0005544 A1* | 1/2007 | Joanovic | ................ | G06N 5/022 706/47 |
| 2009/0132936 A1* | 5/2009 | Anderson | ............... | G06Q 10/10 715/762 |
| 2009/0132958 A1* | 5/2009 | Greer | ................ | G06F 17/30911 715/810 |
| 2009/0154348 A1* | 6/2009 | Newman | ................. | H04L 43/18 370/230 |
| 2009/0154363 A1* | 6/2009 | Stephens | ............... | H04L 43/062 370/241 |
| 2011/0246816 A1* | 10/2011 | Hsieh | ................ | G06F 17/30563 714/4.12 |
| 2012/0096143 A1* | 4/2012 | Suit | ....................... | H04L 41/145 709/224 |
| 2013/0067078 A1* | 3/2013 | Banerjee | ............. | H04L 41/0213 709/224 |

(Continued)

FOREIGN PATENT DOCUMENTS

KR    10-2013-0130706    12/2013

*Primary Examiner* — Phyllis A Book
(74) *Attorney, Agent, or Firm* — KED & Associates, LLP (57) ABSTRACT

This application relates to a method of constructing a data collector. The method may include generating a node corresponding to a data source server to generate a data collecting service node associating the generated node with at least one agent, graphically representing a data collection service flow being associated with one of the at least one agent, the data collection service flow sequentially associating at least a source flow item, a channel item or a sink item and generating an execution environment of data collection service for analyzing the data collection service node and the data collection service flow to control an operation of a data collector. A GUI (Graphic User Interface) environment is provided to more effectively construct and manage a data collection service being installed in a plurality of servers.

17 Claims, 7 Drawing Sheets

(56) References Cited

U.S. PATENT DOCUMENTS

| 2013/0067368 A1* | 3/2013 | Mihara | G06F 9/4443 |
| | | | 715/764 |
| 2016/0094420 A1* | 3/2016 | Clemm | H04L 43/04 |
| | | | 709/224 |
| 2016/0142485 A1* | 5/2016 | Mitkar | H04L 67/1097 |
| | | | 707/681 |

* cited by examiner

METHOD OF CONSTRUCTING DATA COLLECTOR, SERVER PERFORMING THE SAME AND STORAGE MEDIUM FOR THE SAME

BACKGROUND

1. Field

Embodiments may relate to a technology of constructing a data collector and more particularly, to a method of constructing a data collector, a server performing the same and a storage medium for storing computer executable code for the same for effectively managing a data collection service being installed in a plurality of servers in a GUI (Graphic User Interface) environment.

2. Background

Technology for constructing data collectors are known. However, they suffer from various disadvantages.

BRIEF DESCRIPTION OF THE DRAWINGS

Arrangement and embodiments may be described in detail with reference to the following drawings in which like reference numerals refer to like elements and wherein.

DETAILED DESCRIPTION

Various embodiments described in the present disclosure are provided merely to facilitate structural or functional explanation, so the scope of the present invention should not be construed to be limited to the embodiments disclosed in the present disclosure. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the present invention, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps or operations are used for the sake of explanation and do not describe any particular order. The respective operations may be changed from a mentioned order unless specifically mentioned in context. Namely, respective steps may be performed in the same order as described, may be substantially simultaneously performed, or may be performed in reverse order.

The present invention may be implemented as machine-readable codes on a machine-readable medium. The machine-readable medium includes any type of recording device for storing machine-readable data. Examples of the machine-readable recording medium include a read-only memory (ROM), a random access memory (RAM), a compact disk-read only memory (CD-ROM), a magnetic tape, a floppy disk, and optical data storage. The medium may also be carrier waves (e.g., Internet transmission). The computer-readable recording medium may be distributed among networked machine systems which store and execute machine-readable codes in a de-centralized manner.

The terms used in the present application are merely used to describe particular embodiments, and are not intended to limit the present invention. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

In general, a flume is a service for effectively collecting large log data in a distributed environment to integrate the collected large log data and then transmitting to a central storage space such as Hadoop distributed file system (HDFS). Because the flume is formed with a data flow unit based on an architecture for simple and flexible streaming data flow, the flume may easily deal with an obstacle, may modify a confidence level for loss of the log data according to situations and may provide various recovery mechanisms.

In one example, technology may include a method for managing a data set object in a data flow graph indicating a computer program. This technology may store a group formed with a data set object in a data storing system, may associate at least first node of the data flow graph for processing data in a data process system with at least first set object in the group to reuse the data set object in the data flow graph and may simplify an update of the data record. However, a GUI environment that enables a more effective way to construct and manage a data collection service is desirable.

As broadly described and embodied herein, embodiments may provide a method of constructing a data collector capable of constructing a data collector for more effectively managing a data collection service being installed in a plurality of servers in a GUI (Graphic User Interface) environment. Embodiments may provide a method of constructing a data collector capable of symbolically representing a data flow for processing log data collected from each of a plurality of servers to improve a user's usability. Moreover, embodiments may provide a method of constructing a data collector capable of constructing a data collector to simply and quickly perform generation, modification and deletion of a node, agent and flow associated with each of a plurality of servers.

Figure 1:
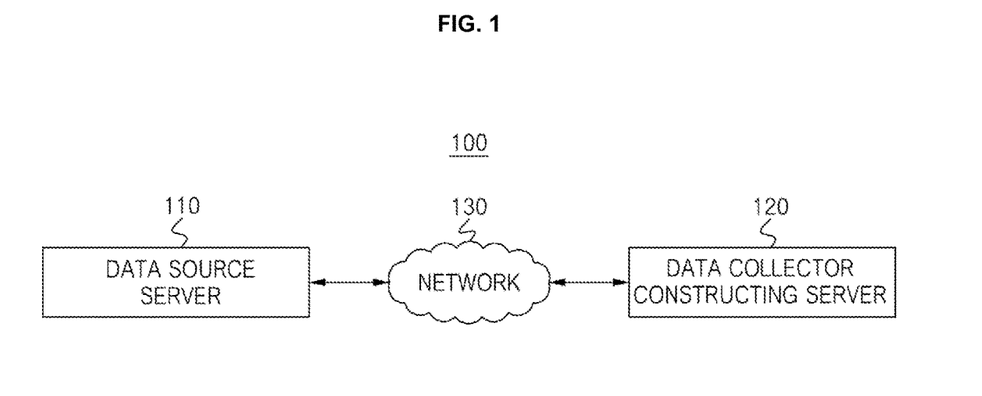
FIG. 1 is a block diagram illustrating a data collector constructing system.

FIG. 1 is a block diagram illustrating a data collector constructing system. The data collector constructing system 100 may include a data source server 110, a data collector constructing server 120 and a network 130.

The data source server 110 may be connected with the data collector constructing server 120 through the network 130 to provide log data. An execution environment of a data collection service may be constructed, and then the data source server 110 may provide the log data to the data collector constructing server 120.

The data collector constructing server 120 may be connected with the data source server 110 through the network 130 to collect the log data. The data collector constructing server 120 may be connected with a plurality of data source servers and may integrate the log data collected from the plurality of data source servers. Herein, the data collector constructing server 120 may be implemented as a plurality of distributed-processable computing devices, without being limited to a single computing device.

The data collector constructing server 120 may generate a data collection service node and a data collection service flow to generate the execution environment of the data collection service based on the data collection service node and the data collection service flow. In below, a detailed description for the data collector constructing server 120 will be described in FIG. 2.

The network 130 may include a wireless or wire communication.

Figure 2:
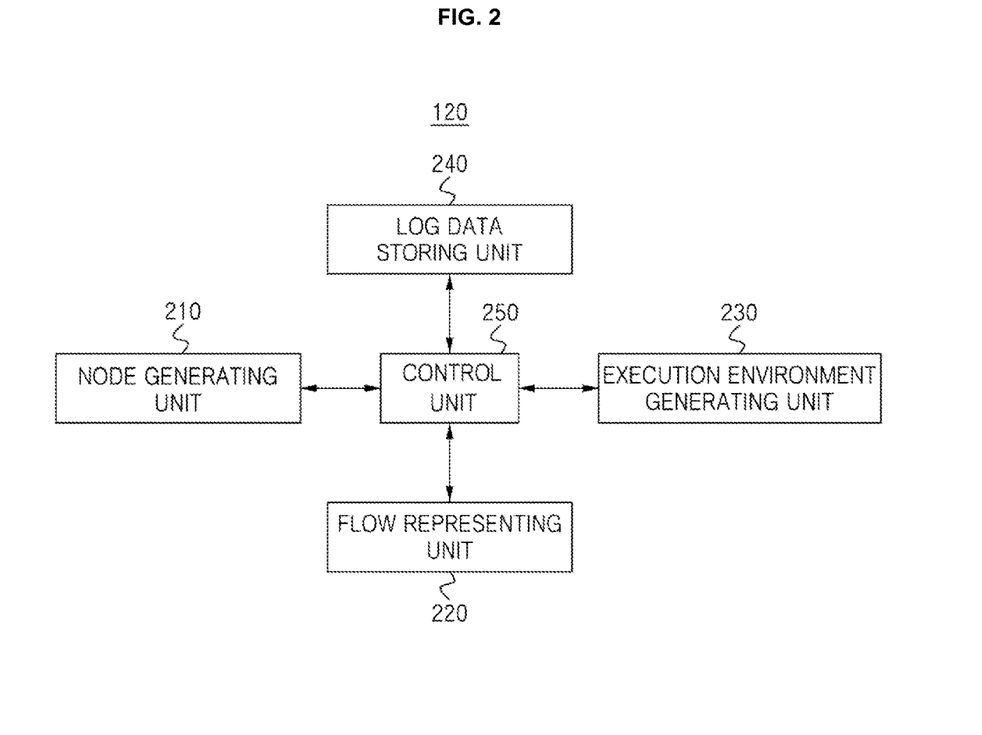
FIG. 2 is a block diagram illustrating a data collector constructing server in FIG. 1.

FIG. 2 is a block diagram illustrating a data collector constructing server in FIG. 1. The data collector constructing server 120 includes a node generating unit 210, a flow representing unit 220, an execution environment generating unit 230, a log data storing unit 240 and a control unit 250.

The node generating unit 210 may generate a node corresponding to the data source server 110. The node corresponds to a host being managed in the data collector constructing server 120 and is associated with the data source server 110. The node generating unit 210 generates the data collection service node associating the generated node with the at least one agent.

The node generating unit 210 may generate a node setup window for setting at least one of a group of the data collection service node and an access authority for the data collection service node. In an embodiment, the node setup window may be arranged on a side of the execution environment of the data collection service to further provide generation, modification and deletion functions of the data collection service node. The data collection service node may be managed as a group unit when the group is set.

In an embodiment, the node generating unit 210 may further provide a search function for the data collection service node. The node generating unit 210 may detect a corresponding data collection service node according to at least one input of an identifier of the data collection service node, a connection state (e.g., CONNECTED or DISCONNECTED) with the data source server 110 and a description for the data collection service node.

The node generating unit 210 may graphically provide the connection state with the data source server 110 and an execution state of the at least one agent according to a generation of the data collection service node. The connection state with the data source server 110 and the execution state of the at least one agent will be referred to FIGS. 5 and 6.

The flow representing unit 220 graphically represents the data collection service flow being associated with one of the at least one agent and sequentially associates at least one of a source flow item, a channel item or a sink item. The source flow item corresponds to a symbolic expression to set an event and an interceptor, the channel item corresponds to a symbolic expression to set a channel and the sink item corresponds to a symbolic expression to set a sink. Herein, the source flow item, the channel item and the sink item may be connected in noncyclic order.

The flow representing unit 220 may sequentially further associate at least one of a channel selection item or a sink processor item. In detail, the flow representing unit 220 may associate the channel selection item between the sequential association with the source flow item and the channel item and may associate the sink processor item between the sequential association with the channel item and the sink item. The channel selection item may correspond to a symbolic expression to select a channel and may connect a plurality of channel items and one of source flow item to transmit the event to the plurality of channel items. The sink processor item may correspond to a symbolic expression to set a sink processor and may transmit data to one of a plurality of sink items.

In an embodiment, the flow representing unit 220 may check a sequential association validity when at least one of the source flow item, the channel item, the sink item, the channel selection item or the sink processor item (hereinafter, referred to as a plurality of items) is sequentially associated. The plurality of items may be associated in order of the source flow item, the channel selection item, the channel item, the sink processor item and the sink item.

In an embodiment, the flow representing unit 220 may further provide a search function for the data collection service flow. The flow representing unit 220 may detect a corresponding data collection service flow according to at least one input of an identifier of the data collection service node, an identifier of the agent and an identifier of the data collection service flow.

The flow representing unit 220 may determine whether the data collection service flow is executed on the execution environment of the data collection service when the data collection service flow is generated. The data collection service flow may correspond to the data collection service node to be generated in plural and may be executed on the execution environment of the data collection service according to the execution state (e.g., USED or UNUSED).

The flow representing unit 220 may generate an item property window for receiving corresponding item properties when one of the plurality of items is selected. For example, the corresponding item properties may correspond to at least one of a source host identifier, a channel selection type, a channel type, a sink processor type or a sink host identifier. The item property window may include different item properties according to each of the plurality of items and may include a necessary item property being necessarily inputted.

The flow representing unit 220 may receive an item property value corresponding to each of the corresponding item properties. For example, the item property value may correspond to at least one of a property value of the source host identifier, a property value of the channel selection type, a property value of the channel type, a property value of the sink processor type or a property value of the sink host identifier. The flow representing unit 220 may check whether an item property value corresponding to the necessary item property of the corresponding item properties is inputted.

The execution environment generating unit 230 may generate the execution environment of the data collection service for analyzing the data collection service node and the data collection service flow to control an operation of a data collector. The execution environment of the data collection service is a platform for managing the data collection service node and the data collection service flow and may provide usability and reliability. In an embodiment, the execution environment generating unit 230 may generate the execution environment of the data collection service based on an agent associated with the data collection service node and the item property value for at least one item associated with the data collection service flow.

The log data storing unit 240 may store log data collected from the data source server 110 according to an operation of the data collector. In an embodiment, the log data storing unit 240 may store the log data according to a version of the data collector. The control unit 250 may control an overall operation of the data collector constructing server 120 and controls a data flow or an operation flow between the node generating unit 210, the flow representing unit 220, the execution environment generating unit 230 or the log data storing unit 240.

Figure 3:
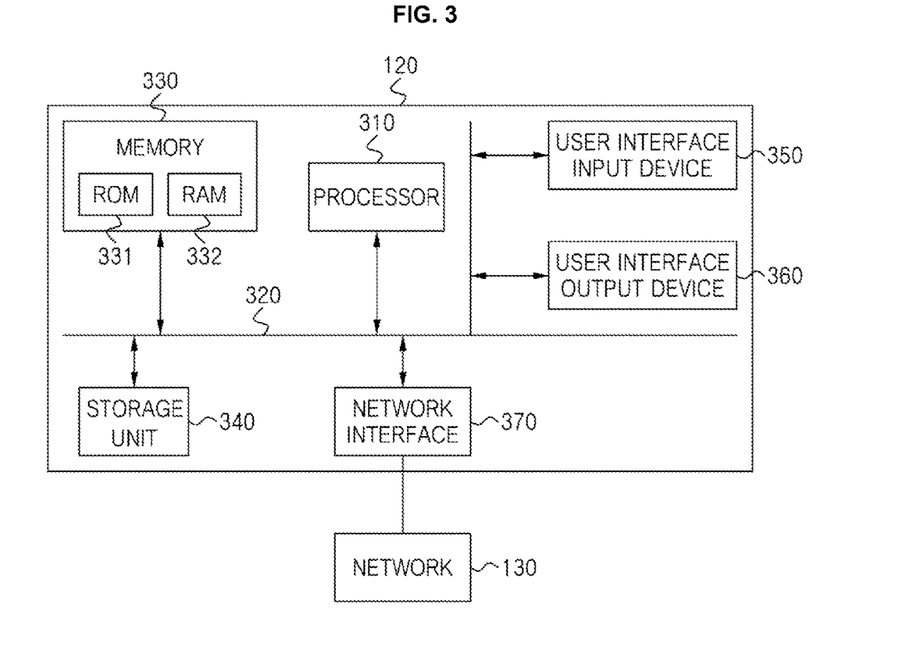
FIG. 3 is a diagram showing a hardware configuration of a data collector constructing server in FIG. 1.

FIG. 3 is a diagram showing a hardware configuration of a data collector constructing server in FIG. 1. The data collector constructing server 120 may include a processor 310 or a CPU communicating with various components through a bus 320. The processor 310 may control an operation of the various components to control an operation of the data collector. Also, the processor 310 may be electrically connected with a memory 330 and may generate and manage the data collection service node and the data collection service flow through commands stored in the memory 330.

The data collector constructing server 120 may include the memory 330 and a storage unit 340. The memory 330 may include ROM (Read Only Memory) 331 and RAM (Random Access Memory) 332. Herein, the memory 330 corresponds to a non-transitory or transitory computer readable storage medium and the storage unit 340 corresponds to a non-transitory computer readable storage medium. At least one of the memory 330 and the storage unit 340 may store a computer code including commands to generate and manage the data collection service node and the data collection service flow.

The data collector constructing server 120 may include a network interface 370 for communicating with the network 130. The network interface 370 may provide an environment transmitting information, data and signals between the data collector constructing server 120 and the network 130.

The user may communicate with the data collector constructing server 120 through a user interface input device 350 (e.g., a mouse, trackball, touch pad, graphic tablet, scanner, barcode scanner for scanning a product barcode, touch screen, keyboard or pointing device). The user interface input device 350 may include various types of devices based on desired features and application for inputting information (e.g., a transaction) to the data collector constructing server 120 or the network 130.

The user may receive information from the data collector constructing server 120 through a user interface output device 360. The user interface output device 360 may include a visual output device such as a display screen, but this is used in the present disclosure merely for convenience to explain an example embodiment. The user interface output device 360 may include various types of devices for outputting information to user and may be combined with an output device such as a video display unit or a speaker. In an embodiment, the display screen may display information received from the data collector constructing server 120 and may receive an input from the user. That is, the display screen may be implemented as the user interface input device 350 as well as the user interface output device 360. Components of the data collector constructing server 120 in FIG. 1 may be performed by using components of the data collector constructing server 120 in FIG. 3.

Figure 4:
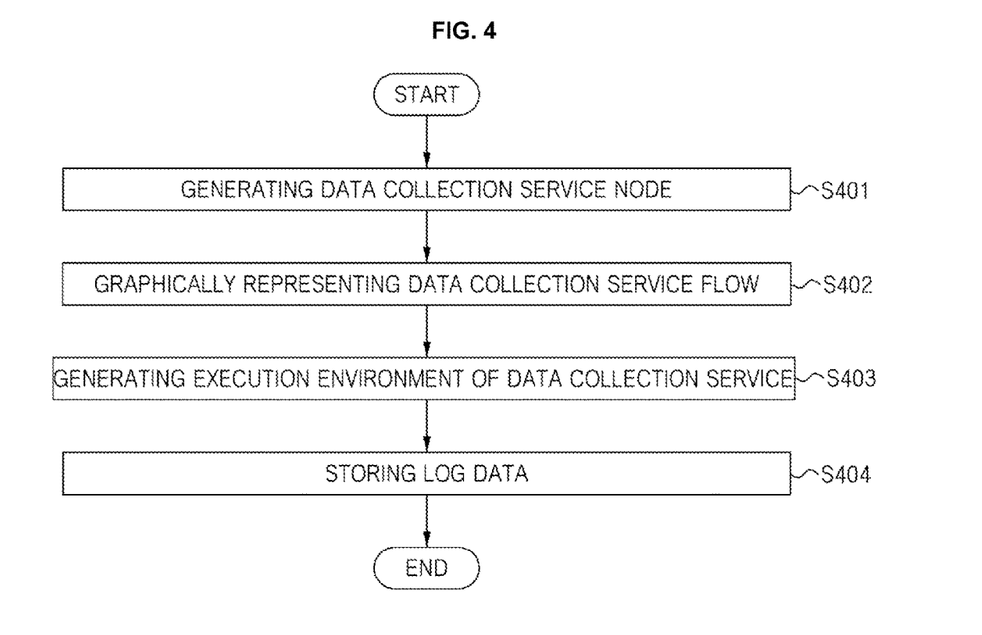
FIG. 4 is a flow chart illustrating a procedure of constructing a data collector being performed on a data collector constructing server in FIG. 1.

FIG. 4 is a flow chart illustrating a procedure of constructing a data collector being performed on a data collector constructing server in FIG. 1. The node generating unit 210 may generate the node corresponding to the data source server 110 (Step S401). In an embodiment, the node generating unit 210 may generate the data collection service node associating the node with the at least one agent according to the access authority for the generated node.

The flow representing unit 220 may graphically represent the data collection service flow being associated with one of the at least one agent and sequentially associate at least one of the source flow item, the channel item or the sink item (Step S402). The flow representing unit 220 may sequentially further associate at least one of the channel selection item or the sink processor item.

The source flow item may correspond to a symbolic expression to set the event and the interceptor, the channel item may correspond to a symbolic expression to set the channel, the sink item may correspond to a symbolic expression to set the sink, the channel selecting item may correspond to a symbolic expression to select the channel and the sink processor item may correspond to a symbolic expression to set the sink processor.

The flow representing unit 220 may determine whether the data collection service flow is executed on the execution environment of the data collection service when the data collection service flow is generated. The data collection service flow may correspond to the data collection service node to be generated in plural and may be executed on the execution environment of the data collection service according to the execution state (e.g., USED or UNUSED).

The execution environment generating unit 230 may generate the execution environment of the data collection service for analyzing the data collection service node and the data collection service flow to control the operation of the data collector (Step S403). The log data storing unit 240 may store the log data collected from the data source server 110 according to the operation of the data collector (Step S404).

Figure 5A:
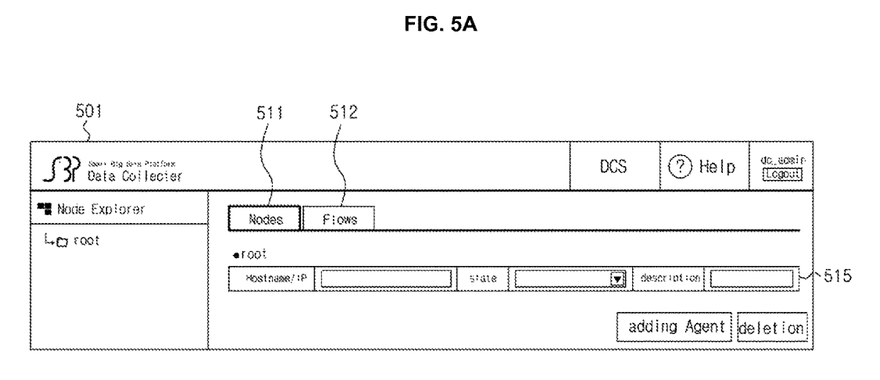
FIGS. 5A and 5B are diagrams showing generation of a data collection service node being performed on a data collector constructing server in FIG. 1 according to an embodiment.
Figure 5B:
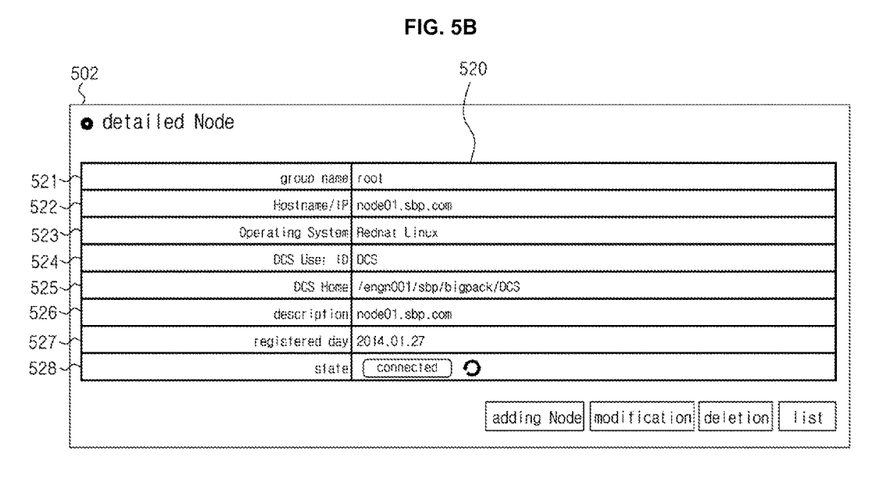

FIGS. 5A and 5B are diagrams showing generation of a data collection service node being performed on a data collector constructing server in FIG. 1 according to an embodiment. Referring to FIG. 5A, the node generating unit 210 may generate a node property window 501 for generating a node. The node property window 501 may include a notes tab 511 and a flows tab 512. A node property input item 515 may be displayed under the nodes tab 511 for inputting properties of the node.

The node may be generated when an event associated with the generation of the node is received in a node tab of the execution environment of the data collection service. Herein, the event may be generated according to an input by a user using the data collector constructing server 120. In an embodiment, the node property input item 515 may include at least one of a group name where the node belong to the group, an identifier of the data source server 110 associated with the node, an OS (Operating System) for the node, a user's ID associated with the node, a user's password associated with the node, a home directory associated with the node or a description for the node. The node generating unit 210 may generate the node according to an input of the node property value corresponding to the node property input item 515.

As illustrated in FIG. 5B, the node generating unit 210 may provide detailed information in a window 502 for the generated node. The detailed information for the node may include at least one of a group name 521 where the node belong to the group, an identifier 522 of the data source server 110 associated with the node, an OS (Operating System) 523 for the node, a user's ID 524 associated with the node, a home directory 525 associated with the node, a description 526 for the node, a node generation date 527 and a connection state 528 with the data source server 110. The connection state 528 with the data source server 110 may be determined as CONNECTED or DISCONNECTED and may be graphically represented. Herein, the CONNECTED indicia may correspond to a connected connection state with the data source server 110 and the DISCONNECTED indicia may correspond to a state where the connection with the data source server 110 is not possible or not available at the time.

Figure 6:
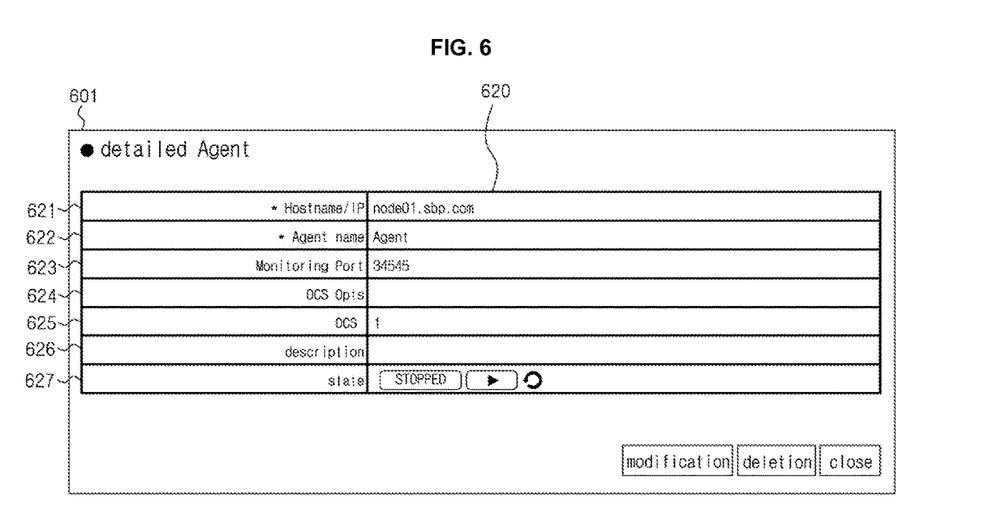
FIG. 6 is a diagram showing an agent generation being performed on a data collector constructing server in FIG. 1 according to an embodiment.

FIG. 6 is a diagram showing an agent generation being performed on a data collector constructing server in FIG. 1 according to an embodiment of the present disclosure. When the node is generated and then an event associated with the generation of the agent is received, the node generating unit 210 may generate an agent property window that includes an agent property input item for generating the agent. The GUI for the agent property window may be similar to the node property window 501 of FIG. 5A.

In an embodiment, the agent property input item may include at least one of an identifier of the data source server 110 associated with a node registering the agent, an identifier of the agent, a port number monitoring the agent, additional option information for the agent or a description for the agent. The node generating unit 210 may generate the agent according to an input of an agent property value corresponding to the agent property input item.

As illustrated in FIG. 6, the node generating unit 210 may display a detailed agent window 601. The detailed agent window 601 may provide detailed information 620 for the generated agent. The detailed information 620 for the generated agent may include at least one of an identifier 621 of the data source server 110 associated with a node registering the agent, an identifier 622 of the agent, a port number 623 monitoring the agent, additional option information 624 for the agent, a number 625 of the data collection service flow associated with the agent, a description 626 for the agent or an execution state 627 of the agent. The execution state 627 of the agent may be determined as FAILED, RUNNING or STOPED and may be graphically represented. The FAILED indicia may correspond to a state where an error occurs in a control of the data collection service or a state where the connection state with the data source server 110 is in a DISCONNECTED state. The RUNNING indicia may correspond to a state where the data collection service is operated. The STOPPED indicia may correspond to a state where the data collection service is not operated.

Figure 7:
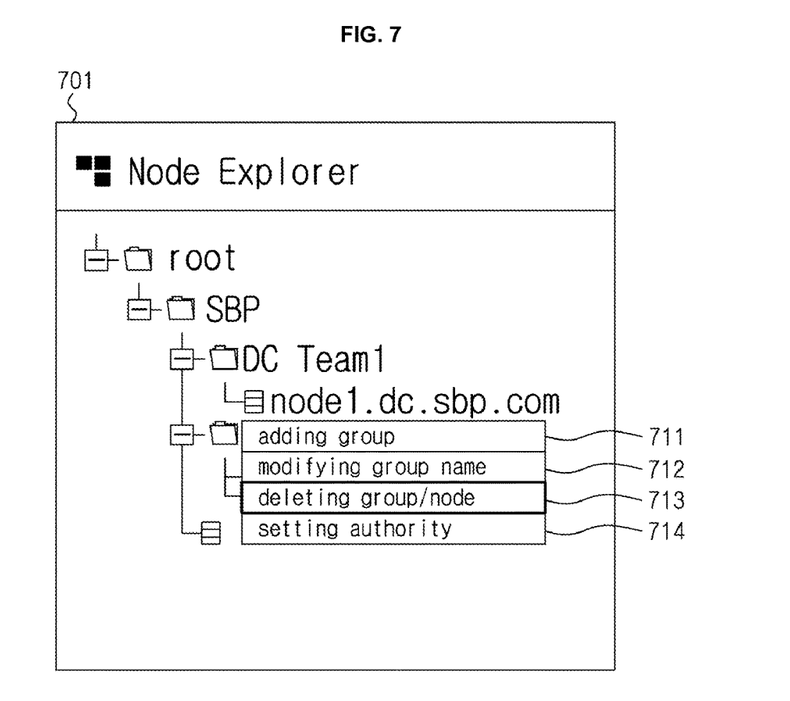
FIG. 7 is a diagram showing a node setup screen being provided from a data collector constructing server in FIG. 1 according to an embodiment.

FIG. 7 is an example embodiment diagram showing a node setup screen being provided from a data collector constructing server in FIG. 1. The node generating unit 210 may generate the node setup window 701 for setting at least one of the group of the data collection service node and the access authority for the data collection service node. The node setup window 701 may arrange the data collection service node according to groups to cause the data collection service node to be managed by the group unit.

In detail, the node generating unit 210 may provide a group addition 711, group name modification 712, group/node deletion 713 and access authority setup 714 functions associated with the data collection service node through the node setup window 701. The authority may be set as at least one of read, modification, deletion or execution and may be assigned for at least one of the user and the group. The node generating unit 210 may provide generation, modification and deletion functions for the at least one agent and the data collection service flow according to an authority set for the data collection service node FIGS. 8 through 10 diagrams showing a generation of a data collection service flow being performed on a data collector constructing server in FIG. 1 according to an embodiment.

Figure 8:
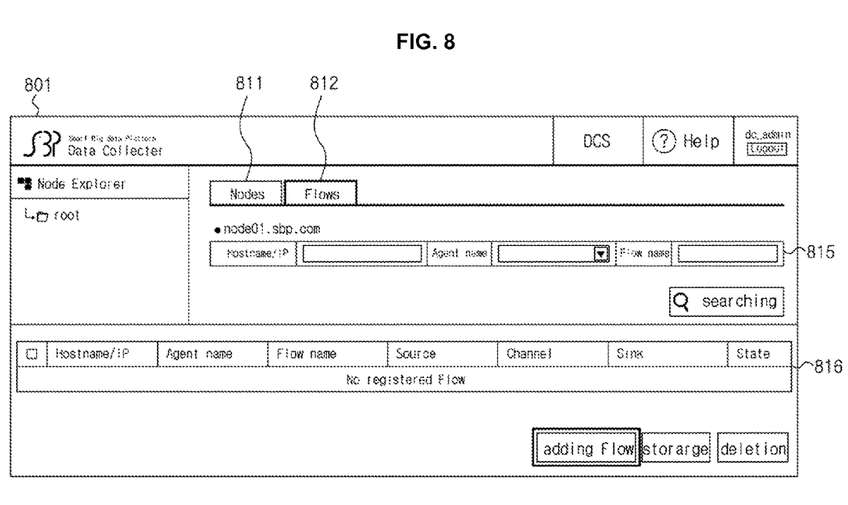
FIGS. 8 through 10 are diagrams showing a generation of a data collection service flow being performed on a data collector constructing server in FIG. 1 according to an embodiment.

Referring to FIG. 8, an item property window 801 may be displayed. The item property window 801 may include the nodes tab 811 and flows tab 812. Under the flows tab 812, input fields 815 for entering properties of the flow may be displayed. Various flows may be searched, added, stored, or deleted in the item property window 801. Here, the nodes tab 811 may correspond to the nodes tab 511 of FIG. 5A.

When an event associated with a flow generation is received in a flow tab 812 of the execution environment of the data collection service, the flow representing unit 220 may generate the item property window 801 including flow item properties for the flow generation. Herein, the event may occur according to an input by the user using the data collector constructing server 120. In an embodiment, the flow item properties may include at least one of an identifier of the data collection service node where the data collection service flow is generated, an identifier of the agent where the data collection service flow is generated, an identifier of the data collection service flow and a state of the data collection service flow (i.e., whether the data collection service flow is executed on the data collection service node). The flow representing unit 220 may graphically represent the data collection service flow according to an input of the item property value corresponding to the flow item properties.

Figure 9:
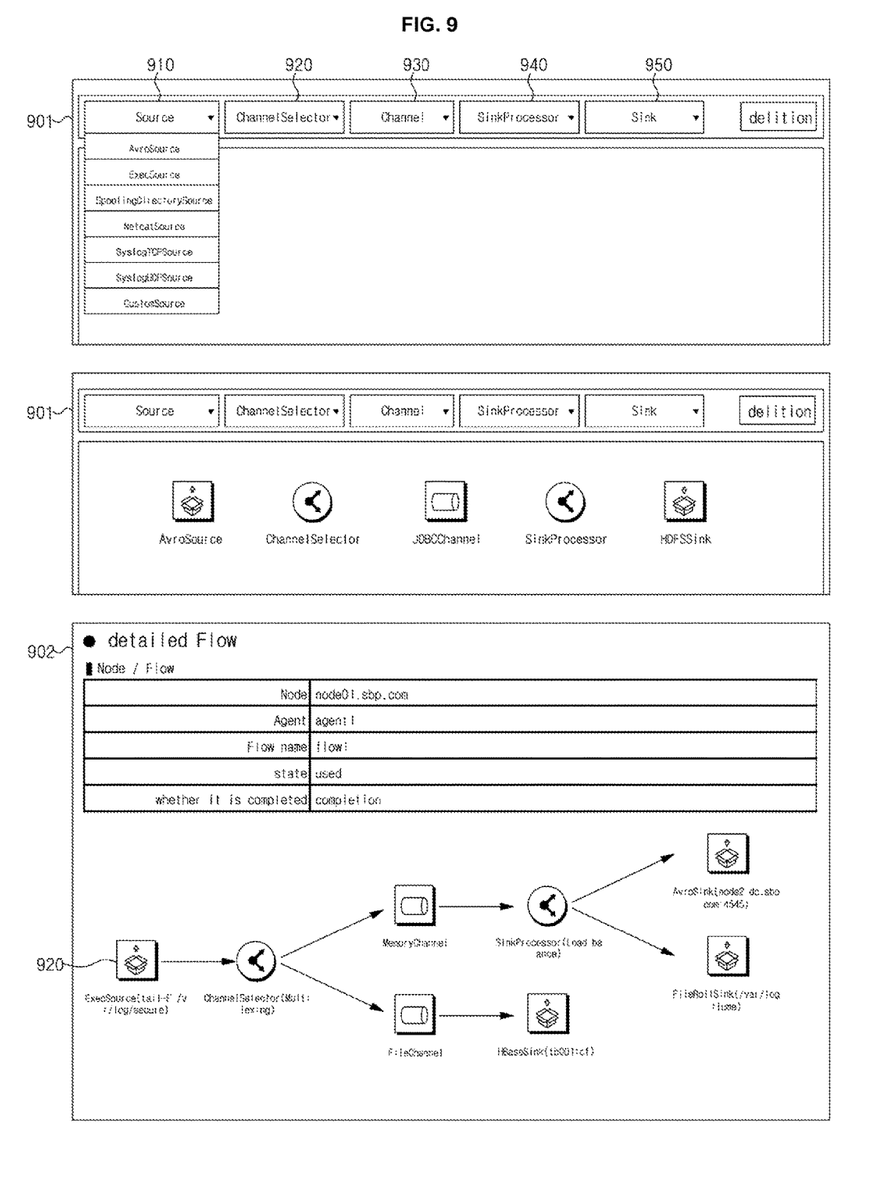

Referring to FIG. 9, the flow representing unit 220 may represent a plurality of types included in each of the plurality of items according to an input event by the user. The input event may be generated by a mouse or a keyboard. In an embodiment, the flow representing unit 220 may provide the plurality of types through a combo box, a drop down menu or another appropriate type of input interface.

The source flow item 910 may include at least one of Avro, Exec, Spooling Directory, NetCat, SyslogTCP, SyslogUDP or Custom as a type. The channel selection item 920 may include at least one of Channel Selector or Custom as a type. The channel item 930 may include at least one of JDBC, Memory, File or Custom as a type. The sink processor item 940 may include at least one of Sink Processor or Custom as a type. The sink tem 950 may include at least one of HDFS, Avro, FileRoll, HBase, AsyncHBase, ElasticSearch or Custom as a type.

The source flow item 910 may be sequentially associated with the channel selection item 920 or one of the channel item 930, the channel selection item 920 may be connected with at least one channel item 930, the channel item 930 may connected with one of the sink processor item 940 or one of the sink item 950 and the sink processor item 940 may be connected with at least one sink item 950. The detailed flow may be graphically illustrated in a window 902. A plurality of icons 920 may be displayed in window 902 to graphically illustrate the flow between various nodes. The icons 920 may be spatially arranged to illustrate the flow as shown in FIG. 9.

Figure 10:
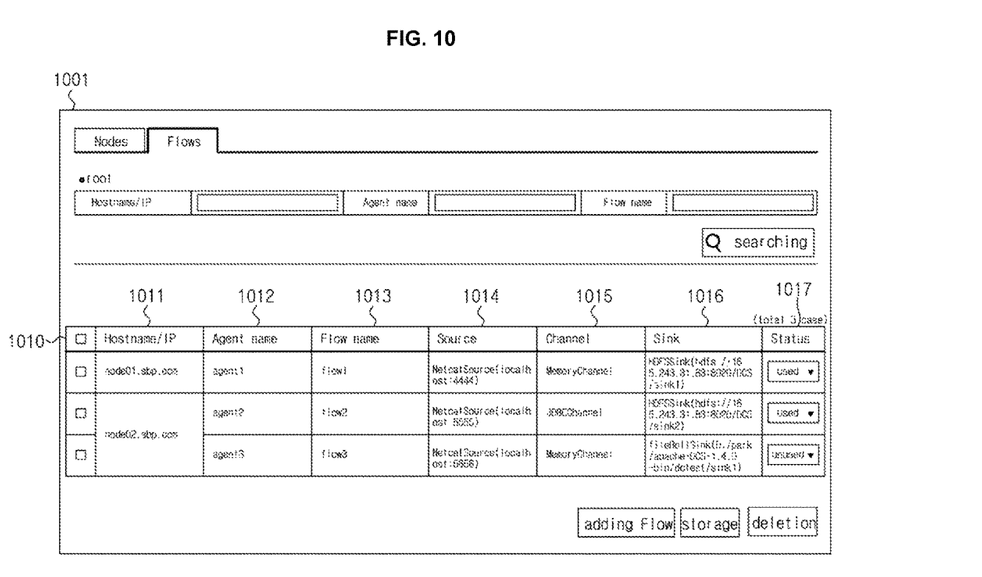

Referring to FIG. 10, the flow representing unit 220 may generate a data collection service flow list 1001 including an identifier 1011 of the data collection service node associated with the data source server 110, an identifier 1012 of a corresponding agent, an identifier 1013 of the data collection service flow, a type of the source flow item 1014, a type of the channel item 1015, a type of the sink item 1016 and a status item 1017 to indicate whether the data collection service flow is executed. The flow representing unit 220 may add a user input property to each of the identifier of the data collection service flow to graphically represent the plurality of items associated with the data collection service flow corresponding to the user input property selected by the user.

As broadly described and embodied herein, embodiments may provide a method of constructing a data collector capable of constructing a data collector effectively managing a data collection service being installed in a plurality of servers in GUI (Graphic User Interface) environment. Embodiments may provide a method of constructing a data collector capable of symbolically representing a data flow for processing log data collected from each of a plurality of servers to improve a user's usability. Moreover, embodiments may provide a method of constructing a data collector capable of constructing a data collector to simply and quick perform generation, modification and deletion for a node, agent and flow associated with each of a plurality of servers.

In at least one embodiment, a method of constructing a data collector may include generating a node corresponding to a data source server to generate a data collecting service node associating the generated node with at least one agent, graphically representing a data collection service flow being associated with one of the at least one agent, the data collection service flow sequentially at least associating a source flow item, a channel item and a sink item and generating an execution environment of data collection service for analyzing the data collection service node and the data collection service flow to control an operation of a data collector.

In at least one embodiment, generating the node corresponding to the data source server may include generating a node setup window for setting at least one of a group of the data collection service node and an access authority for the data collection service node.

Generating the node corresponding to the data source server may include providing generation, modification and deletion functions for the at least one agent and the data collection service flow according to the access authority for the data collection service node.

Generating the node corresponding to the data source server may include graphically providing a connection state with the data source server and an execution state of the at least one agent. Generating the node corresponding to the data source server may include representing a number of the data collection service flow associated with a corresponding agent.

In at least one embodiment, the source flow item may correspond to a symbolic expression setting an event and an interceptor, the channel item may correspond to a symbolic expression setting a channel and the sink item may correspond to a symbolic expression setting a sink.

In at least one embodiment, graphically representing the data collection service flow may include determining whether the data collection service flow is executed on the execution environment of the data collection service.

In at least one embodiment, graphically representing the data collection service flow may include sequentially further associating at least one of a channel selection item and a sink processor item.

Graphically representing the data collection service flow may include checking a sequential association validity when at least one of the source flow item, the channel item, the sink item, the channel selection item and the sink processor item (hereinafter, referred to as a plurality of items) is sequentially associated.

Graphically representing the data collection service flow may include generating an item property window for receiving corresponding item properties when one of the plurality of the items is selected, the corresponding item properties corresponding to at least one of a source host identifier, a channel selection type, a channel type, a sink processor type and a sink host identifier.

Graphically representing the data collection service flow may include receiving an item property value corresponding to each of the corresponding item properties, the item property value corresponding to a property value of the source host identifier, a property value of the channel selection type, a property value of the channel type, a property value of the sink processor type and a property value of the sink host identifier.

In at least one embodiment, graphically representing the data collection service flow may include generating a data collection service flow list including an identifier of the data collection service node associated with the data source server, an identifier of a corresponding agent, an identifier of the data collection service flow, a type of the source flow item, a type of the channel item, a type of the sink item and whether the data collection service flow is executed.

In at least one embodiment, generating data collection service execution environment may include generating the execution environment of the data collection service based on an agent associated with the data collection service node and an item property value for at least one item associated with the data collection service flow.

In at least one embodiment, a data collector constructing server may include a processor, a memory including at least one storage space and a non-transitory computer-readable medium including commands causing the processor to perform a following method when the processor is executed and the method includes generating a node corresponding to a data source server to generate a data collecting service node associating the generated node with at least one agent, graphically representing a data collection service flow being associated with one of the at least one agent, the data collection service flow sequentially at least associating a source flow item, a channel item and a sink item and generating an execution environment of data collection service for analyzing the data collection service node and the data collection service flow to control an operation of a data collector.

In at least one embodiment, a machine-readable non-transitory medium storing a computer program for a method of constructing a data collector may have stored thereon machine-executable instructions for generating a node corresponding to a data source server to generate a data collecting service node associating the generated node with at least one agent, graphically representing a data collection service flow being associated with one of the at least one agent, the data collection service flow sequentially at least associating a source flow item, a channel item and a sink item and generating an execution environment of data collection service for analyzing the data collection service node and the data collection service flow to control an operation of a data collector.

Embodiments may construct a data collector effectively managing a data collection service being installed in a plurality of servers in GUI (Graphic User Interface) environment. Embodiments may symbolically represent a data flow for processing log data collected from each of a plurality of servers to improve a user's usability.

Embodiments may connect with a plurality of query performance engines to resolve an inconvenience by separately using the plurality of query performance engines. Moreover, embodiments may construct a data collector to simply and quick perform generation, modification and deletion for a node, agent and flow associated with each of a plurality of servers.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of constructing a data collector comprising:
generating, at a data collection constructing server, a first node corresponding to a data source server, and generating a data collection service node that associates the generated first node with at least one agent,
  wherein generating the first node corresponding to the data source server includes generating a node setup window to be displayed for setting an access authority for the data collection service node and for setting a function of at least one of a group of the data collection service node,
  wherein the displayed node setup window is to:
    display an indicator to set access authority, and
    display a plurality of indicators to set a function to at least one group,
  wherein the displayed plurality of indicators includes:
    a group generation function indicator,
    a group modification function indicator, and
    a group deletion function indicator,
  wherein generating the first node corresponding to the data source server includes generating another window to be displayed for displaying detailed information for the first node,
  wherein displayed detailed information for the first node includes an operating system, a user identification (ID), a home directory, a description of the node, a registered day and a connection state of the node,
  wherein the connection state is graphically represented to show that the node is connected or disconnected with another server, and the another window is to further display a button for adding a node, a button for modifying a node, a button for deleting a node and a button for displaying a list;
graphically displaying a data collection service flow being associated with one of the at least one agent, the data collection service flow to sequentially associate at least one of a source flow item, a channel item or a sink item,
  wherein graphically displaying the data collection service flow includes sequentially further associating at least one of a channel selection item or a sink processor item,
  wherein the channel selection item being associated between the sequential association with the source flow item and the channel item, and the sink processor item being associated between the sequential association with the channel item and the sink item,
  wherein the channel selection item connects a plurality of channel items and one of source flow item to transmit the event to the plurality of channel items, and the sink processor item transmits data to one of a plurality of sink items; and
providing an execution environment of a data collection service for analyzing the data collection service node, and the data collection service flow to control an operation of a data collector.

2. The method of claim 1, wherein generating the first node corresponding to the data source server includes generating a window for displaying detailed information for the first node.

3. The method of claim 2, wherein the displayed detailed information for the node further includes at least one of a group name, or a hostname, and wherein the window includes at least one button for adding a node, modifying a node, deleting a node or displaying a list.

4. The method of claim 1, wherein generating the first node corresponding to the data source server includes graphically displaying a connection state with the data source server and an execution state of the at least one agent.

5. The method of claim 1, wherein generating the first node corresponding to the data source server includes representing a number of the data collection service flow associated with a corresponding agent.

6. The method of claim 1, wherein generating the first node corresponding to the data source server including generating a window for displaying detailed information for an agent, the detailed information for the agent including at least one of a hostname, an agent name, a port number associated with the agent, a description of the agent or an execution state.

7. The method of claim 1, wherein a source flow item corresponds to a symbolic expression to set an event and an interceptor, the channel item corresponds to a symbolic expression to set a channel and a sink item corresponds to a symbolic expression to set a sink.

8. The method of claim 1, wherein graphically displaying the data collection service flow includes determining whether the data collection service flow is executed on the execution environment of the data collection service.

9. The method of claim 1, wherein graphically displaying the data collection service flow includes checking a sequential association validity when a plurality of items are sequentially associated, the plurality of items including at least one of the source flow item, a channel item, the sink item, the channel selection item or the sink processor item.

10. The method of claim 9, wherein graphically displaying the data collection service flow includes generating an item property window for receiving corresponding item properties when one of the plurality of the items is selected, the corresponding item properties corresponding to at least one of a source host identifier, a channel selection type, a channel type, a sink processor type or a sink host identifier.

11. The method of claim 10, wherein graphically displaying the data collection service flow includes receiving an item property value corresponding to each of the corresponding item properties, the item property value corresponding to at least one of a property value of the source host identifier, a property value of the channel selection type, a property value of the channel type, a property value of the sink processor type or a property value of the sink host identifier.

12. The method of claim 1, wherein graphically displaying the data collection service flow includes generating and displaying a data collection service flow list including:
an identifier of the data collection service node associated with the data source server,
an identifier of a corresponding agent,
an identifier of the data collection service flow,
a type of the source flow item,
a type of the channel item,
a type of the sink item, and
an item indicating whether the data collection service flow is executed.

13. The method of claim 12, wherein graphically displaying the data collection service flow including displaying a window that includes the data collection service flow list and at least one icon that graphically represents the data collection service flow.

14. The method of claim 13, wherein the at least one icon is arranged in the window to spatially represent a logical order of data flow.

15. The method of claim 1, wherein generating data collection service execution environment includes generating the execution environment of the data collection service based on an agent associated with the data collection service node and an item property value for at least one item associated with the data collection service flow.

16. A data collector constructing server comprising:
a processor;
a memory including at least one storage space; and
a non-transitory computer-readable medium including commands causing the processor to perform a following method when the processor is executed, the method comprising:
generating a first node corresponding to a data source server, and generating a data collection service node that associates the generated first node with at least one agent,
wherein generating the first node corresponding to the data source server includes generating a node setup window to be displayed for setting an access authority for the data collection service node and for setting a function of at least one of a group of the data collection service node,
wherein the displayed node setup window is to:
display an indicator to set access authority, and
display a plurality of indicators to set a function to at least one group,
wherein the displayed plurality of indicators includes:
a group generation function indicator,
a group modification function indicator, and
a group deletion function indicator,
wherein generating the first node corresponding to the data source server includes generating another window to be displayed for displaying detailed information for the first node,
wherein displayed detailed information for the first node includes at least one of an operating system, a user identification (ID), a home directory, a description of the node, a registered day and a connection state of the node,
wherein the connection state is graphically represented to show that the node is connected or disconnected with another server, and the another window is to further display a button for adding a node, a button for modifying a node, a button for deleting a node and a button for displaying a list;
graphically displaying a data collection service flow being associated with one of the at least one agent, the data collection service flow to sequentially associate at least one of a source flow item, a channel item or a sink item; and
wherein graphically displaying the data collection service flow includes sequentially further associating at least one of a channel selection item or a sink processor item,
wherein the channel selection item being associated between the sequential association with the source flow item and the channel item, and the sink processor item being associated between the sequential association with the channel item and the sink item,
wherein the channel selection item connects a plurality of channel items and one of source flow item to transmit the event to the plurality of channel items, and the sink processor item transmits data to one of a plurality of sink items; and providing an execution environment of a data collection service for analyzing the data collection service node, and the data collection service flow to control an operation of a data collector.

17. A machine-readable non-transitory medium storing a computer program for a method of constructing a data collector, the machine-readable non-transitory medium having stored thereon machine-executable instructions for:

generating a first node corresponding to a data source server, and generating a data collection service node that associates the generated first node with at least one agent, wherein generating the first node corresponding to the data source server includes generating a node setup window to be displayed for setting an access authority for the data collection service node and for setting a function of at least one of a group of the data collection service node, wherein the displayed node setup window is to:
display an indicator to set access authority, and
display a plurality of indicators to set a function to at least one group, wherein the displayed plurality of indicators includes:
a group generation function indicator,
a group modification function indicator, and
a group deletion function indicator, wherein generating the first node corresponding to the data source server includes generating another window to be displayed for displaying detailed information for the first node, wherein displayed detailed information for the first node includes at least one of an operating system, a user identification (ID), a home directory, a description of the node, a registered day and a connection state of the node, wherein the connection state is graphically represented to show that the node is connected or disconnected with another server, and the another window is to further display a button for adding a node, a button for modifying a node, a button for deleting a node and a button for displaying a list;

graphically displaying a data collection service flow being associated with one of the at least one agent, the data collection service flow to sequentially associate at least one of a source flow item, a channel item or a sink item, wherein graphically displaying the data collection service flow includes sequentially further associating at least one of a channel selection item or a sink processor item, wherein the channel selection item being associated between the sequential association with the source flow item and the channel item, and the sink processor item being associated between the sequential association with the channel item and the sink item, wherein the channel selection item connects a plurality of channel items and one of source flow item to transmit the event to the plurality of channel items, and the sink processor item transmits data to one of a plurality of sink items; and providing an execution environment of a data collection service for analyzing the data collection service node, and the data collection service flow to control an operation of a data collector.

* * * * *